United States Patent
Brummel et al.

(10) Patent No.: US 12,013,119 B2
(45) Date of Patent: Jun. 18, 2024

(54) METHOD AND ASSEMBLY FOR CONTROLLING AN INTERNAL COMBUSTION ENGINE HAVING MULTIPLE BURNERS

(71) Applicant: SIEMENS ENERGY GLOBAL GMBH & CO. KG, Munich (DE)

(72) Inventors: Hans-Gerd Brummel, Berlin (DE); Uwe Pfeifer, Berlin (DE); Volkmar Sterzing, Neubiberg (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 131 days.

(21) Appl. No.: 17/602,398

(22) PCT Filed: Mar. 19, 2020

(86) PCT No.: PCT/EP2020/057579
§ 371 (c)(1),
(2) Date: Oct. 8, 2021

(87) PCT Pub. No.: WO2020/212067
PCT Pub. Date: Oct. 22, 2020

(65) Prior Publication Data
US 2022/0252264 A1     Aug. 11, 2022

(30) Foreign Application Priority Data
Apr. 16, 2019    (EP) ..................... 19169491

(51) Int. Cl.
*F23N 5/00*      (2006.01)
*F02D 41/14*    (2006.01)

(52) U.S. Cl.
CPC ......... *F23N 5/003* (2013.01); *F02D 41/1405* (2013.01); *F23N 2223/04* (2020.01);
(Continued)

(58) Field of Classification Search
CPC ........... F02D 41/1405; F05D 2270/709; F23N 2223/48; F23N 2900/05006
See application file for complete search history.

(56) References Cited

U.S. PATENT DOCUMENTS

| | | | |
|---|---|---|---|
| 8,573,245 B1 * | 11/2013 | Jansen | F02C 7/232 137/240 |
| 2010/0070098 A1 * | 3/2010 | Sterzing | G05B 13/027 700/287 |

(Continued)

FOREIGN PATENT DOCUMENTS

| | | |
|---|---|---|
| CN | 101725423 A | 6/2010 |
| CN | 102135026 A | 7/2011 |

(Continued)

OTHER PUBLICATIONS

PCT International Search Report and Written Opinion of International Searching Authority dated Apr. 30, 2020 corresponding to PCT International Application No. PCT/EP2020/057579 filed Mar. 19, 2020.

*Primary Examiner* — Scott J Walthour
(74) *Attorney, Agent, or Firm* — Schmeiser, Olsen & Watts LLP (57) ABSTRACT

A method and an assembly for controlling an internal combustion engine having multiple burners is provided. Combustion measurement data is collected in a burner-specific manner for each burner and assigned to a burner identification identifying the respective burner. Performance measurement data of the internal combustion engine is also collected and used to determine a performance value. A machine learning model is trained by means of the combustion measurement data, the associated burner identifications and the performance measurement data, to generate burner-specific control data which optimizes the performance value when the burners are actuated in a burner-specific manner (Continued)

using the control data. The control data generated by the trained machine learning model is output for the burner-specific actuation of the burners.

13 Claims, 3 Drawing Sheets

(52) U.S. Cl.
CPC ...... *F23N 2223/40* (2020.01); *F23N 2223/48* (2020.01); *F23N 2237/02* (2020.01); *F23N 2241/20* (2020.01); *F23N 2900/05006* (2013.01)

(56) References Cited

U.S. PATENT DOCUMENTS

| | | | |
|---|---|---|---|
| 2013/0186057 A1* | 7/2013 | Shanmugam | F23R 3/36 60/776 |
| 2014/0020400 A1 | 1/2014 | Ceccherini et al. | |
| 2020/0132552 A1 | 4/2020 | Brummel et al. | |

FOREIGN PATENT DOCUMENTS

| | | |
|---|---|---|
| CN | 106401753 A | 2/2017 |
| DE | 102008057199 A1 | 7/2009 |
| DE | 102017204434 A1 | 9/2018 |

* cited by examiner

METHOD AND ASSEMBLY FOR CONTROLLING AN INTERNAL COMBUSTION ENGINE HAVING MULTIPLE BURNERS

CROSS-REFERENCE TO RELATED APPLICATIONS

This application claims priority to PCT Application No. PCT/EP2020/057579, having a filing date of Mar. 19, 2020, which is based off of EP Application No. 19169491.8, having a filing date of Apr. 16, 2019, the entire contents both of which are hereby incorporated by reference.

FIELD OF TECHNOLOGY

The following relates to a method and assembly for controlling a combustion engine having multiple burners.

BACKGROUND

Modern combustion engines, such as gas turbines, jet engines or combustion motors, commonly have multiple burners which, in separate or in common combustion chambers, generate high temperatures and volume flows that are converted into kinetic energy. During the combustion process, it is generally the case that pressure oscillations are stimulated and pollutants, such as nitrogen oxides, carbon monoxide or unburned hydrocarbons, are generated or emitted.

In many combustion engines, the combustion process in the burners is structured through an adjustment of different fuel stages. Here, fuel flows with different flow rates, introduction pressures and/or fuel/air mixture ratios are supplied in parallel, in a manner differentiated into the different fuel stages, to a respective burner. For each fuel stage, it is commonly the case that a separate annular line is provided which leads to multiple burners. Through suitable adjustment of the individual fuel stages, the operation of the combustion engine can be optimized. Here, it is commonly sought to reduce pressure fluctuations or temperature peaks in the combustion chambers, a blockage of fuel nozzles and/or an emission of pollutants, and to increase a power or an efficiency of the combustion engine. The optimization objectives pursued are however often mutually opposed, and can be achieved only approximately.

SUMMARY

An aspect relates to create a method and an arrangement for controlling a combustion engine with multiple burners, which method and arrangement allow an improved optimization of the operation of the combustion engine.

According to embodiments of the invention, for the control of a combustion engine with multiple burners, combustion measurement data are recorded in a burner-specific manner for a respective burner and assigned to a burner identifier that identifies the respective burner. The combustion engine may in particular be a gas turbine, a jet engine or a combustion motor. Here, a respective burner may also have multiple combustion locations and/or be configured as a burner group. Furthermore, performance measurement data of the combustion engine are recorded and used to determine a performance value. A machine learning model is trained, using the combustion measurement data, the assigned burner identifiers and the performance measurement data, to generate burner-specific control data that optimize the performance value when the burners are actuated in burner-specific fashion using the control data. Here, an optimization is also to be understood in particular to mean an approximation to an optimum determined by a specified criterion. Such a criterion may be evaluated in a so-called reward function, loss function or cost function for the performance value. The control data generated by the trained machine learning model are output for the burner-specific actuation of the burners.

It is possible in particular for pressure fluctuations in a combustion chamber, pollutant emissions, a gas temperature, a spatial temperature distribution, a fuel feed flow, a mixture ratio or other parameters of a combustion process to be recorded in burner-specific fashion as combustion measurement data. The performance value may in particular relate to a generated power or an efficiency of the combustion engine, pressure fluctuations in a combustion chamber, a temperature distribution, a gas inlet temperature, local temperature peaks, pollutant emissions, a blockage of fuel nozzles, a fuel consumption, or wear of the combustion engine. By means of the control data, it is possible in particular for a mixture ratio between fuel and air, a fuel feed flow or an injection pressure to be controlled in burner-specific fashion.

An arrangement for controlling a combustion engine, a computer program product (non-transitory computer readable storage medium having instructions, which when executed by a processor, perform actions) and a computer-readable memory medium are provided for executing a method according to embodiments of the invention.

The method according to embodiments of the invention and the arrangement according to embodiments of the invention may be executed or implemented for example by means of one or more processors, computers, application-specific integrated circuits (ASIC), digital signal processors (DSP) and/or so-called field programmable gate arrays (FPGA).

An advantage of embodiments of the invention can be seen in particular in the fact that, through the burner-specific recording of measurement data, and the performance optimization, it is possible for individual differences between the individual burners, which may be caused by manufacturing tolerances or different line routing configurations, to be compensated in a coordinated manner. In this way, in many cases, it is possible for temperature, pressure or pollutant extremes, material fatigue, wear or pollutant emissions to be reduced, and/or for an efficiency or a generated power to be increased. Through the use of a machine learning model, it is also possible for complex interdependencies or correlations between burner-specific combustion measurement data, performance measurement data and control data optimized in burner-specific fashion to be modelled relatively accurately. This applies in particular also to different operating states of the combustion engine.

In one advantageous embodiment of the invention, a fuel feed flow to a respective burner may be split up in burner-specific fashion into multiple fuel stages in a manner dependent on the control data. By means of the various fuel stages, it is possible for multiple fuel flows to be conducted to each burner, which fuel flows differ with regard to their fuel/air mixture ratio, their introduction pressure or with regard to some other introduction parameter. In this way, it is possible in each burner for the combustion process to be spatially, temporally, physically and/or chemically structured and thus in particular optimized in burner-specific fashion with regard to the performance value.

The splitting-up of the fuel feed flow into the fuel stages may be performed by means of burner-specific and/or fuel-stage-specific multi-way valves. Through the use of multi-way valves, outlay on piping for the combustion engine can often be considerably reduced.

It is advantageously possible that, for the brief interruption or reduction of a fuel feed flow, a valve common to several burners is actuated. In this way, multiple burners can be jointly turned down quickly, independently of their burner-specific actuation.

In one advantageous refinement of embodiments of the invention, combustion measurement data may be recorded in a fuel-stage-specific manner and assigned to a respective fuel stage identifier, which is additionally used for the training of the machine learning model. In this way, fuel-stage-specific interdependencies between combustion measurement data and performance measurement data or control data can also be modelled by the machine learning model. These interdependencies can advantageously be taken into consideration in the optimization of the performance value.

In one particularly advantageous embodiment of the invention, the machine learning model may be trained by means of a reinforcement learning method. As reinforcement learning methods, use may for example be made of so-called PGNRR methods (PGNRR: Policy Gradient Neural Rewards Regression), VOP-PGNRR methods (VOP-PGNRR: Variable Objective Policy PGNRR) or model-based reinforcement learning methods such as RCNN methods (RCNN: Recurrent Control Neural Network). It is possible in particular for one or more so-called closed control policies to be generated as a result of the training. Such closed control policies can generally be executed very quickly and consequently allow high time resolution in the control of the combustion engine.

The machine learning model and/or a control policy may comprise an artificial neural network, a recurrent neural network, a convolutional neural network, a Bayesian neural network, an autoencoder, a deep learning architecture, a support vector machine, a data-driven trainable regression model, a k-nearest neighbor classifier, a physical model and/or a decision tree.

In a further advantageous embodiment of the invention, the machine learning model may be trained further during ongoing operation of the combustion engine on the basis of presently recorded combustion measurement data and performance measurement data. This allows an ongoing optimization of operation and adaptation to changes in the combustion engine resulting from operating duration or ambient conditions.

Furthermore, the machine learning model may be pre-trained in a calibration phase using a training combustion engine and/or using a simulation model of a combustion engine. Such a simulation model is commonly also referred to as design model or digital twin. A structurally identical or similar model of the combustion engine may be used as a training combustion engine. By means of such pre-training, training on the combustion engine can often be considerably shortened.

The machine learning model may advantageously comprise multiple submodels which are specific to a respective burner and which each generate specific control data for the respective burner. In this way, the training task can be broken down into smaller subtasks, the interdependencies of which are generally easier to model and which can often be executed much more quickly.

In particular, the submodels may be executed in parallel in order to generate the burner-specific control data. In this way, an execution time can generally be considerably shortened.

In one advantageous refinement of embodiments of the invention, a further machine learning model may be trained to generate further control data which are used to set a fuel flow distribution, in particular an overall fuel flow distribution, between the burners and/or a combustion temperature and which optimize the performance value and/or a further performance value. Combustion measurement data, assigned burner identifiers and performance measurement data may be utilized as training data. Furthermore, simulation data from a simulation of the combustion engine or of a part thereof may be used for the training of the further machine learning model. The use of simulation data is advantageous because, in general, a relatively small amount of suitable training data are available for such control operations that act across several burners. The setting of the fuel flow distribution between the burners is advantageous in particular for annular combustion chambers in which the burners are arranged in a common ring-shaped combustion chamber. Since each burner generally influences the entire annular combustion chamber, it is possible through control of the fuel distribution across several burners to compensate fluctuations that arise across several burners.

BRIEF DESCRIPTION

Some of the embodiments will be described in detail, with reference to the following figures, wherein like designations denote like members, wherein.

DETAILED DESCRIPTION

Figure 1:
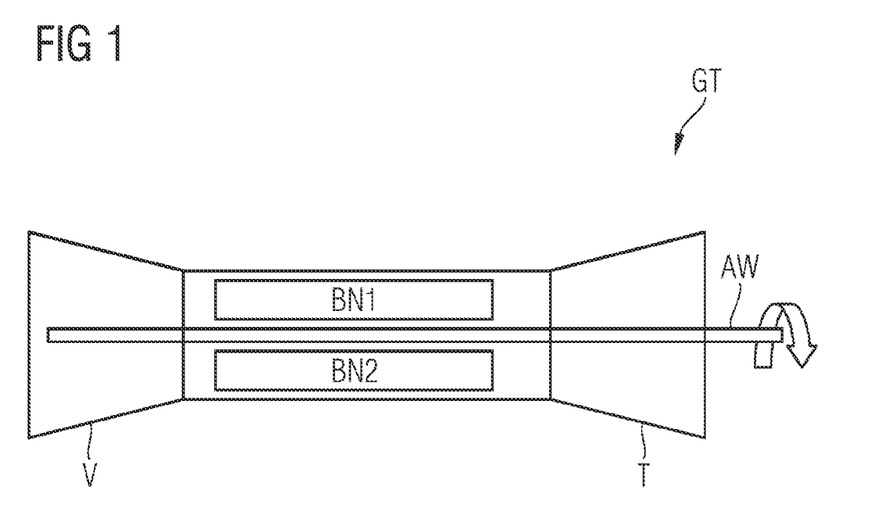
FIG. 1 shows a gas turbine with multiple burners.

FIG. 1 shows a gas turbine GT as combustion engine in a schematic illustration. The gas turbine GT has a compressor V for compressing inflowing air, multiple burners BN1 and BN2 for the combustion of supplied fuel, and a turbine T for converting thermal and kinetic energy generated by the combustion into rotational energy. The latter is transmitted via a drive shaft AW inter alia to the compressor V in order to drive the latter.

The application of embodiments of the invention to a gas turbine is to be understood merely as an example. Alternatively or in addition, embodiments of the invention may also be used for controlling other combustion engines, for example jet engines or combustion motors.

Figure 2:
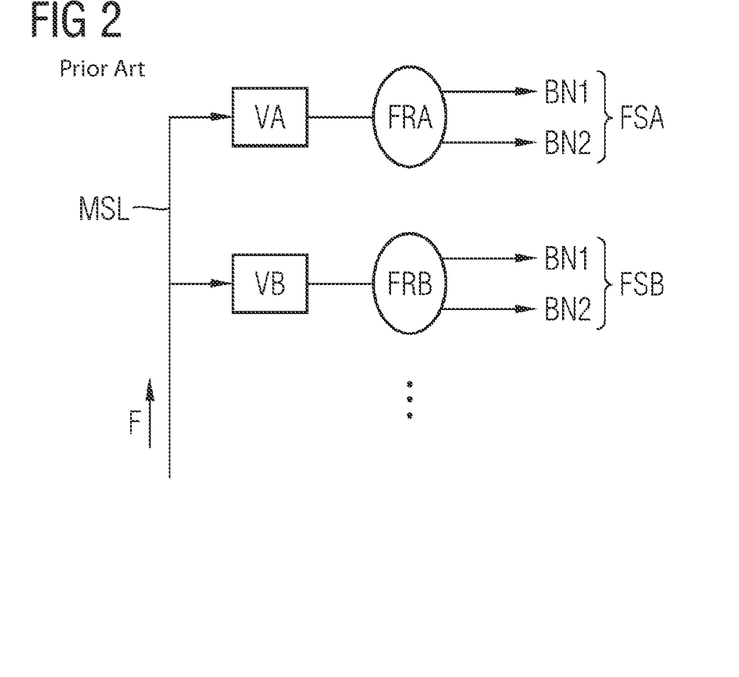
FIG. 2 shows a diagram for illustrating a fuel supply in the case of a gas turbine according to the prior art.

FIG. 2 shows a diagram for illustrating a fuel supply in the case of a gas turbine according to the prior art. The gas turbine has multiple burners, of which only two burners BN1 and BN2 are illustrated in FIG. 2 for the sake of clarity. The gas turbine furthermore has multiple fuel stages, of which likewise only two fuel stages FSA and FSB are explicitly indicated in FIG. 2 for the sake of clarity. In the different fuel stages FSA and FSB, in each case multiple different fuel flows are introduced through separate fuel nozzles into a respective burner BN1 or BN2. The fuel flows may differ for example with regard to their flow rates, fuel/air mixture ratios or introduction pressures. In this way, in each burner BN1 or BN2, the combustion process can be spatially, temporally, physically and/or chemically structured and thus in particular optimized.

According to the prior art, for the combustion stages FSA and FSB, a respective separate, stage-specific annular line FRA and FRB is provided, which leads in each case to all burners BN1 and BN2. The annular lines FRA and FRB are each connected via a controllable, fuel-stage-specific valve VA and VB respectively to a main supply line MSL of the gas turbine. The valves VA and VB split up an overall fuel flow F into the individual fuel stages FSA and FSB.

Owing to the supply to a respective fuel stage FSA or FSB via an annular line FRA or FRB respectively, the splitting-up of the fuel feed flows is effective for all burners BN1 and BN2 without differentiation. Owing to geometrical differences of the line routing configuration and owing to manufacturing tolerances or changes in the burners BN1 and BN2 owing to operating duration, however, the fuel feed flows to the individual burners BN1 and BN2 and the individual combustion processes differ at least slightly. These differences generally also give rise to different pollutant emissions, temperature peaks or pressure fluctuations in the individual burners BN1 and BN2 and cannot be compensated by means of the valves VA and VB positioned upstream of the annular lines FRA and FRB. Accordingly, a controller of a combustion engine according to the prior art is commonly configured on the basis of the burner with the poorest combustion values. This however has the result that the other burners are not operated optimally.

Figure 3:
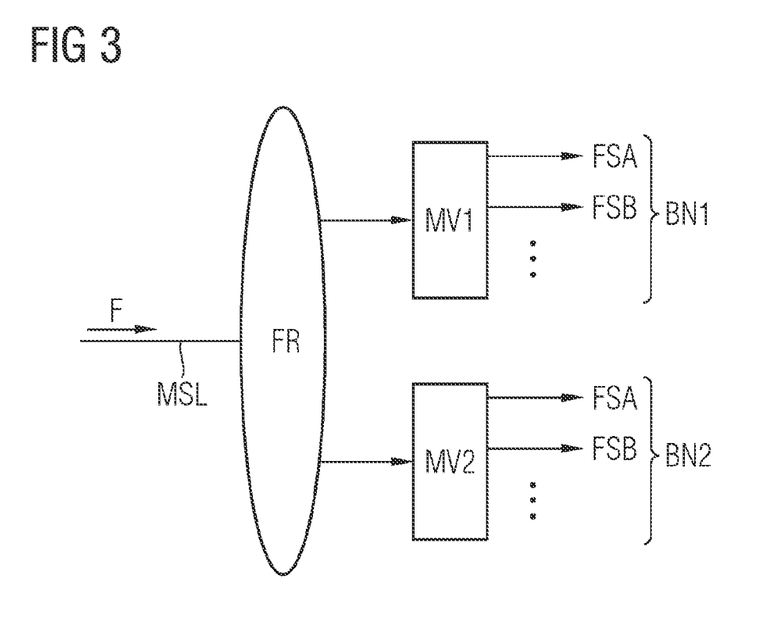
FIG. 3 shows a diagram for illustrating a fuel supply in the case of a gas turbine according to an embodiment of the invention.

FIG. 3 shows a diagram for illustrating a fuel supply in the case of a gas turbine according to embodiments of the invention. The gas turbine according to embodiments of the invention has multiple burners, of which only two burners BN1 and BN2 are explicitly illustrated for the sake of clarity. A respective burner BN1 or BN2 may in this case also have multiple combustion locations and/or be configured as a burner group. Furthermore, the gas turbine according to embodiments of the invention has multiple fuel stages, of which likewise only two fuel stages FSA and FSB are explicitly indicated in FIG. 3 for the sake of clarity. The fuel stages FSA and FSB serve, as already described above, for splitting up the fuel feed flows to the individual burners BN1 and BN2. By contrast to the gas turbine according to the prior art described in conjunction with FIG. 2, it is however the case in the gas turbine according to embodiments of the invention that this splitting-up is performed individually for each burner BN1 and BN2 or each burner group.

For the burner-specific splitting-up of the fuel feed flows into the individual fuel stages FSA and FSB, controllable burner-specific multi-way valves MV1 and MV2 are provided. Each burner BN1 and BN2 is thus specifically assigned a multi-way valve MV1 and MV2 respectively. The multi-way valves MV1 and MV2 are connected via an annular line FR, which is common to several stages, to a main supply line MSL of the gas turbine, via which an overall fuel flow F is conducted to the multi-way valves MV1 and MV2.

Valves common to several burners (said valves not being illustrated) may be positioned upstream of the multi-way valves MV1 and MV2 for the purposes of briefly interrupting or reducing a fuel feed flow. Such interruptions of the fuel feed flow are commonly also referred to as trips, and such reductions of the fuel feed flow are commonly referred to as unloads.

By means of the burner-specific splitting-up of the fuel flow into the individual fuel stages FSA and FSB, it is possible for burner-specific differences in the combustion process to be compensated, and furthermore for optimization to be performed in burner-specific fashion. In particular, it is possible for pollutant emissions, local temperature peaks, pressure fluctuations, power, efficiency, fuel consumption, service life, wear, fatigue and/or a blockage of the fuel nozzles to be optimized individually for each burner. Through the possible omission of stage-specific annular lines, it is furthermore possible in many cases for outlay on piping to be reduced.

Furthermore, it is possible for individual burners BN1 and BN2 to be operated in targeted fashion at different power points, with different combustion temperatures and/or with different fuel quantities. It is thus generally possible for a formation of carbon monoxide, in particular at lower load, and/or of nitrogen oxides to be reduced in an effective manner. It is thus possible in many cases for gas turbines to be operated at very low load, and kept on standby, whilst adhering to emissions regulations.

Figure 4:
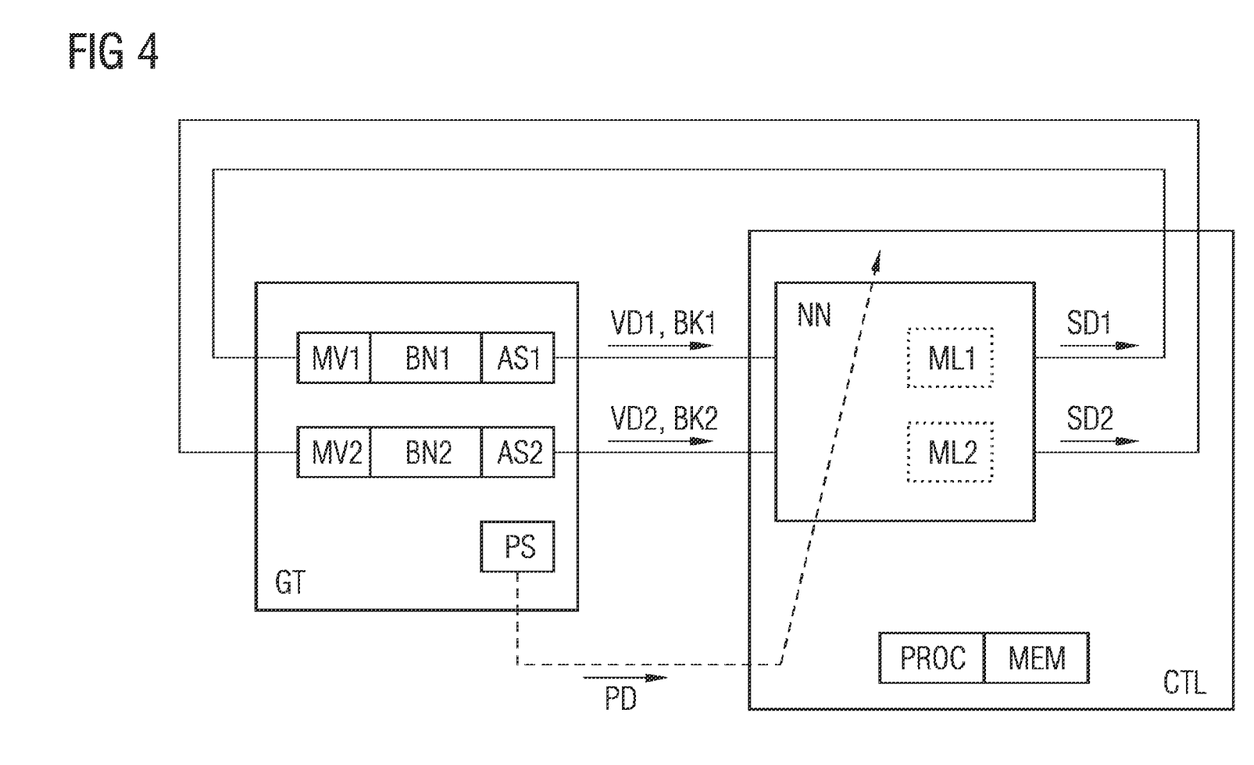
FIG. 4 shows an arrangement for controlling the gas turbine according to an embodiment of the invention.

FIG. 4 shows, in a schematic illustration, an arrangement for controlling a gas turbine GT according to embodiments of the invention. Where the same reference designations as in FIG. 3 are used in FIG. 4, these reference designations are used to denote the same entities as in FIG. 3. These entities may in particular be designed as described in FIG. 3.

The gas turbine GT has a turbine controller CTL which implements a control method according to embodiments of the invention. The turbine controller CTL is, in FIG. 4, illustrated externally with respect to the gas turbine GT. Alternatively, the turbine controller CTL may also be implemented entirely or partially in the gas turbine GT. The turbine controller has one or more computers or processors PROC for executing method steps of the turbine controller CTL, and one or more memories MEM for storing the data to be processed by the turbine controller CTL. In particular, a nonvolatile memory is provided in the turbine controller CTL for the purposes of controlling a computer program that implements the method according to embodiments of the invention.

The gas turbine GT has multiple burners, of which only two burners BN1 and BN2 are illustrated in FIG. 4 for the sake of clarity. Here, a respective burner BN1 or BN2 may also have multiple combustion locations and/or be configured as a burner group. Each burner BN1 and BN2 is fed in a burner-specific manner by means of an electric or hydraulic multi-way valve MV1 and MV2 respectively. The multi-way valves MV1 and MV2 split up a fuel feed flow to the burners BN1 and BN2 into the individual fuel stages in burner-specific or burner-group-specific fashion as already described in conjunction with FIG. 3.

The multi-way valves MV1 and MV2 are each actuated by means of burner-specific control data, in this case SD1 and SD2 respectively, by means of which the splitting-up of the fuel feed flow into the various fuel stages is set in burner-specific or burner-group-specific fashion for each multi-way valve MV1 and MV2. A mixing ratio between fuel and air, an injection pressure or other control parameters may furthermore also be set in burner-specific or burner-group-specific fashion by means of the control data SD1 and SD2.

At a respective burner BN1 and BN2, there is arranged a respective burner-specific sensor AS1 and AS2 which respectively measures burner-specific combustion measurement data VD1 and VD2 of the respective burner BN1 and BN2 in real time. In the present exemplary embodiment, it is the case in particular that acoustic vibrations of a respective burner BN1 and BN2 generated by pressure fluctuations within a respective combustion chamber are measured. Here, intensities of the acoustic vibrations are recorded in each case in multiple frequency ranges, for example between 15 Hz and 10 kHz, for each burner BN1 and BN2 separately, and are output as combustion measurement data VD1 and VD2 respectively. Additionally, by means of the sensors AS1 and AS2, it is also possible for a burner-specific emission of pollutants, in particular of nitrogen oxides, carbon monoxide or unburned hydrocarbons, a chemical composition of the pollutants, a combustion temperature or combustion temperature distribution, an inlet or exhaust-gas temperature, a pressure, a fuel-air mixture ratio, a fuel feed flow or other combustion parameters to be recorded as combustion measurement data VD1 and VD2.

The combustion measurement data VD1 and VD2 measured and output by a respective sensor AS1 and AS2 are assigned to a respective burner identifier BK1 and BK2, which identifies the respective burner BN1 and BN2, and are transmitted to the turbine controller CTL.

Furthermore, the gas turbine GT has performance sensors PS which measure performance measurement data PD of the gas turbine GT in real time. The performance sensors PS may entirely or partially comprise the sensors AS1 and AS2. The performance measurement data PD may be measured in burner-specific fashion or across several burners, and may be part of the combustion measurement data VD1 and VD2 measured by the sensors AS1 and AS2. The performance measurement data PD may in particular comprise measurement data relating to power, efficiency, fuel consumption or wear of the gas turbine GT, relating to pressure fluctuations in the combustion chambers, relating to emissions of pollutants, in particular of nitrogen oxides, carbon monoxide or unburned hydrocarbons, relating to inlet temperatures, relating to exhaust-gas temperatures, relating to local temperature peaks or relating to a blockage of fuel nozzles, and measurement data relating to other operating variables that relate to a performance of the gas turbine GT.

The combustion measurement data VD1 are transmitted in a manner assigned to the burner identifier BK1, and the combustion measurement data VD2 are transmitted in a manner assigned to the burner identifier BK2, to a machine learning model NN of the turbine controller CTL. The performance measurement data PD are likewise transmitted, by the performance sensors PS, to the machine learning model NN. The performance measurement data PD are used together with the combustion measurement data VD1 and VD2, in a manner assigned to the burner identifiers BK1 and BK2, as training data for training the machine learning model NN in data-driven fashion.

In the present exemplary embodiment, the machine learning model NN is implemented by an artificial neural network. The artificial neural network is trained using the reinforcement learning method. Here, the performance measurement data PD are evaluated in a reward function which, on the basis of the performance measurement data PD, ascertains a performance value for the gas turbine GT, which performance value is to be optimized by the training. A large number of known reinforcement learning methods are available for implementing the training. A so-called PGNRR method (PGNRR: Policy Gradient Neural Rewards Regression), a VOP-PGNRR method (VOP-PGNRR: Variable Objective Policy PGNRR) or a model-based reinforcement learning method, such as a so-called RCNN method (RCNN: Recurrent Control Neural Network), may be used for the training.

In the present exemplary embodiment, for each burner of the gas turbine GT, in this case BN1 and BN2, the machine learning model NN comprises a burner-specific submodel ML1 and ML2 respectively, which is trained using the training data PD and VD1, BK1 and VD2, BK2 respectively to generate specific control data, in this case SD1 and SD2, by means of the respective burner BN1 and BN2. The submodels ML1 and ML2 are trained in parallel, and the trained submodels ML1 and ML2 are executed in parallel during productive operation of the gas turbine GT. Through the parallel execution of the submodels ML1 and ML2, the application of the trained machine learning model NN can be greatly accelerated, such that a high time resolution can be achieved in the generation of the control data SD1 and SD2.

In this context—following the conventional linguistic usage in the art—training is to be understood to mean a mapping of input data of a machine learning model, in this case NN, onto one or more target variables, which mapping is optimized in accordance with specified criteria during a training phase. Here, a training structure of the machine learning model NN which is optimized with regard to the specified criteria is formed. The training structure may for example comprise a network structure of neurons of a neural network and/or weightings of connections between the neurons, which are configured by means of the training such that the specified criteria are satisfied as effectively as possible. The specified criteria may be represented in a reward function that is to be optimized.

In the present exemplary embodiment, the machine learning model NN receives the burner-specific combustion measurement data VD1 and VD2, in each case in a manner assigned to the respective burner identifier BK1 and BK2, as input data from the gas turbine GT. As further input data, the machine learning model NN receives the performance measurement data PD. The output data of the machine learning model NN are returned as burner-specific control data SD1 and SD2 to the gas turbine GT. The multi-way valve MV1 is actuated as described above using the control data SD1, and the multi-way valve MV2 is actuated as described above using the control data SD2.

The machine learning model NN is trained such that its output data, in this case the burner-specific control data SD1 and SD2, optimize the performance value, and thus to a certain extent the performance measurement data PD, when the multi-way valves MV1 and MV2 are actuated in burner-specific fashion by means of said control data SD1 and SD2. The use of the performance measurement data PD as an optimization criterion for the machine learning model NN is indicated by means of a dashed arrow in FIG. 4. The training is thus reduced to an optimization problem, for which a large number of optimization methods are available.

Through the optimization of the performance value, the machine learning model NN is trained to generate control data SD1 and SD2 that are advantageous for, that is to say increase the performance of, the operation of the gas turbine GT from the combustion-specific combustion measurement data VD1 and VD2. Using the control data SD1 and SD2 optimized in burner-specific fashion, it is generally possible for an efficiency of the gas turbine GT to be increased and/or for an emission of pollutants, or wear, of the gas turbine GT to be reduced. Furthermore, local temperature peaks can be avoided, or a blockage of fuel nozzles can be reduced.

The machine learning model NN is trained further during ongoing productive operation of the gas turbine GT on the basis of presently recorded combustion measurement data and performance measurement data. In particular, a closed control loop for continuous optimization may be provided, in order to thus continuously adapt the gas turbine GT to changes resulting from ambient conditions or operating duration.

In one design variant of embodiments of the invention, the combustion measurement data VD1 and VD2 may also be recorded in fuel-stage-specific fashion by means of the sensors AS1 and AS2, and said combustion measurement data may be assigned a fuel stage identifier that identifies the respective fuel stage. The both burner-specific and fuel-stage-specific combustion measurement data VD1 and VD2 may then be transmitted, in a manner assigned to the respective fuel stage identifier, as input data to the machine learning model NN in order to train the latter. The additional differentiation by fuel stages makes it possible for fuel-stage-specific interdependencies to also be modelled and taken into consideration in the optimization of the performance value.

In a further design variant of embodiments of the invention, a further machine learning model (not illustrated) may be provided which is trained to generate further control data by means of which a fuel flow distribution between the burners BN1 and BN2 is set and which additionally optimize the performance value and/or a further performance value.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for controlling a combustion engine with multiple burners, the method comprising:
   a) recording burner-specific combustion measurement data for a respective burner, each respective burner being assigned a burner identifier that identifies the respective burner;
   b) recording performance measurement data of the combustion engine which is used to determine a performance value;
   c) training a machine learning model using the burner-specific combustion measurement data, the assigned burner identifiers and the performance measurement data, to generate burner-specific control data that optimize the performance value when the multiple burners are actuated using the burner-specific control data; and
   d) outputting the burner-specific control data generated by the trained machine learning model to actuate the multiple burners;
   wherein the machine learning model comprises multiple submodels which are specific to respective burners and which each generate the burner-specific control data for the respective burners.

2. The method as claimed in claim 1, wherein a fuel feed flow to a respective burner is split into multiple fuel stages based on the control data.

3. The method as claimed in claim 2, wherein splitting the fuel feed flow into the multiple fuel stages is performed by burner-specific multi-way valves.

4. The method as claimed in claim 1, wherein, for an interruption or reduction of a fuel feed flow, a valve common to several burners is actuated.

5. The method as claimed in claim 1, wherein the burner-specific combustion measurement data are recorded and assigned respective fuel-stage identifiers, and the assigned fuel stage identifiers are used for the training of the machine learning model.

6. The method as claimed in claim 1, wherein the machine learning model is trained using a reinforcement learning method.

7. The method as claimed in claim 1, wherein the machine learning model comprises an artificial neural network, a recurrent neural network, a convolutional neural network, a Bayesian neural network, an autoencoder, a deep learning architecture, a support vector machine, a data-driven trainable regression model, a k-nearest neighbor classifier, a physical model and/or a decision tree.

8. The method as claimed in claim 1, wherein the machine learning model is trained further during ongoing operation of the combustion engine based on the burner-specific combustion measurement data and the performance measurement data recorded during the ongoing operation of the combustion engine.

9. The method as claimed in claim 1, wherein the machine learning model is pre-trained in a calibration phase using a training combustion engine and/or using a simulation model of a combustion engine.

10. The method as claimed in claim 1, wherein the multiple submodels are executed in parallel in order to generate the burner-specific control data.

11. The method as claimed in claim 1, wherein a further machine learning model is trained to generate further control data which are used to set a fuel flow distribution between the multiple burners and/or a combustion temperature and which optimize the performance value and/or a further performance value.

12. A controller that controls a combustion engine with multiple burners, the controller configured to perform a method comprising:
   a) recording burner-specific combustion measurement data for a respective burner, each respective burner being assigned a burner identifier that identifies the respective burner;
   b) recording performance measurement data of the combustion engine which is used to determine a performance value;
   c) training a machine learning model using the burner-specific combustion measurement data, the assigned burner identifiers and the performance measurement data, to generate burner-specific control data that optimize the performance value when the multiple burners are actuated using the burner-specific control data; and
   d) outputting the burner-specific control data generated by the trained machine learning model to actuate the multiple burners;
   wherein the machine learning model comprises multiple submodels which are specific to respective burners and which each generate the burner-specific control data for the respective burners.

13. A computer program product, comprising a computer readable hardware storage device having computer readable program code stored therein, said program code executable by a processor of a computer system to implement a method comprising:
   a) recording burner-specific combustion measurement data for a respective burner, each respective burner being assigned a burner identifier that identifies the respective burner;
   b) recording performance measurement data of the combustion engine which is used to determine a performance value;

c) training a machine learning model using the burner-specific combustion measurement data, the assigned burner identifiers and the performance measurement data, to generate burner-specific control data that optimize the performance value when the multiple burners are actuated using the burner-specific control data; and d) outputting the burner-specific control data generated by the trained machine learning model to actuate the multiple burners;

wherein the machine learning model comprises multiple submodels which are specific to respective burners and which each generate the burner-specific control data for the respective burners.

* * * * *